United States Patent [19]
Oltmanns

[11] Patent Number: 5,532,535
[45] Date of Patent: Jul. 2, 1996

[54] ELECTRIC DRIVE FOR AN AUTOMOTIVE VEHICLE

[75] Inventor: Karl-Heinz Oltmanns, Oldenburg, Germany

[73] Assignee: Licentia Patent-Verwaltungs-GmbH, Frankfurt am Main, Germany

[21] Appl. No.: 266,534

[22] Filed: Jun. 27, 1994

[30] Foreign Application Priority Data

Jun. 25, 1993 [DE] Germany .......................... 43 21 172.0

[51] Int. Cl.⁶ .................................................. H02K 5/16
[52] U.S. Cl. ........................ 310/90; 310/54; 310/83; 310/112; 74/467; 180/65.6; 384/461; 475/220
[58] Field of Search .................................... 310/90, 75 R, 310/83, 75 D, 54, 58, 112, 89, 254, 261; 384/461; 475/220, 231; 74/467; 180/65.5, 65.6

[56] References Cited

U.S. PATENT DOCUMENTS 2,429,069 10/1947 McDonald ................................ 310/83
3,115,839 12/1963 Pollak et al. ............................. 310/54
5,156,579 10/1992 Wakata et al. ......................... 180/65.5

*Primary Examiner*—R. Skudy
*Attorney, Agent, or Firm*—Spencer & Frank

[57] ABSTRACT

An electric drive for a vehicle includes a motor housing; bearing plates closing opposite ends of the housing; roller bearings held in the bearing plates; an electric motor accommodated in the motor housing and including an axially hollow rotor shaft affixed to a rotor and journalling in the roller bearings; a gear housing adjoining the motor housing; a gearing accommodated in the gear housing; a gear coupling the rotor shaft with an input of the gearing; and a first output shaft coupled to an output of the gearing. The first output shaft extends through an end wall of the gear housing and passes axially through the rotor shaft and through the bearing plates. The first output shaft has an end situated externally of the motor housing. The electric drive further has a second output shaft coupled to an output of the gearing. The second output shaft extends through an end wall of the gear housing and has an end situated externally of the gear housing. First and second coupling members are mounted on the ends of the first and second output shafts. The first and second coupling members are adapted to transmit a driving torque to front and rear wheels of the vehicle.

10 Claims, 1 Drawing Sheet

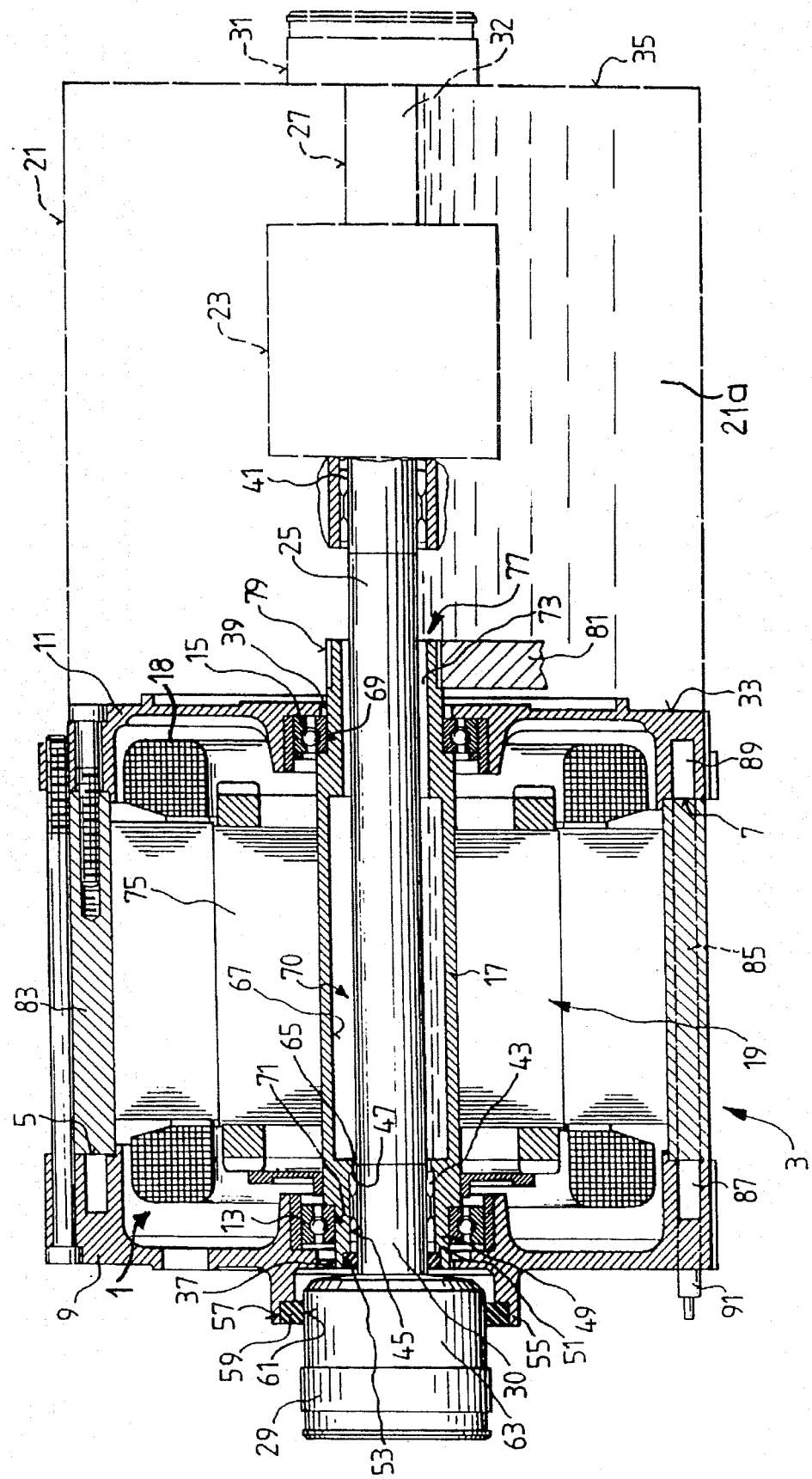

ELECTRIC DRIVE FOR AN AUTOMOTIVE VEHICLE

BACKGROUND OF THE INVENTION

This invention relates to an electric drive for an automotive vehicle including an electric motor, particularly an asynchronous motor whose motor housing is, at each axial end, closed by a bearing plate each provided with a roller bearing for receiving the rotor shaft of the electric motor. The rotor transmits its torque to an input of a differential gear which is switchable by clutches and which is disposed in a gear housing. The differential gear rotates two output shafts which drive the front and rear wheels with the intermediary of cardan shafts.

Electrical drives are particularly well adapted for vehicles used in city driving. A stepless control of the vehicle speed and the torque in the entire travel range is effected without a switch arrangement by means of a low-loss voltage and current regulation, resulting in a smooth, high-rate acceleration. Such electric vehicle drives are characterized by low noise and lack of exhaust fumes; consequently, such drives are environment friendly to a very substantial degree.

SUMMARY OF THE INVENTION

It is an object of the invention to provide an improved electric drive of the above-outlined type which is of compact construction and operates with a superior cooling effect resulting in an increase in efficiency.

This object and others to become apparent as the specification progresses, are accomplished by the invention, according to which, briefly stated, the electric drive for a vehicle includes a motor housing; bearing plates closing opposite ends of the housing; roller bearings held in the bearing plates; an electric motor accommodated in the motor housing and including an axially hollow rotor shaft affixed to a rotor and journalling in the roller bearings; a gear housing adjoining the motor housing; a gearing accommodated in the gear housing; a gear coupling the rotor shaft with an input of the gearing; and a first output shaft coupled to an output of the gearing. The first output shaft extends through an end wall of the gear housing and passes axially through the rotor shaft and through the bearing plates. The first output shaft has an end situated externally of the motor housing. The electric drive further has a second output shaft coupled to an output of the gearing. The second output shaft extends through an end wall of the gear housing and has an end situated externally of the gear housing. First and second coupling members are mounted on the ends of the first and second output shafts. The first and second coupling members are adapted to transmit a driving torque to front and rear wheels of the vehicle.

According to a particularly advantageous feature of the invention, the hollow rotor shaft has, between its bearing surfaces at opposite ends, an inner cylindrical enlargement constituting a chamber for receiving oil which is admitted through an annular connecting channel to a needle bearing for lubricating purposes. The oil chamber is in communication with the oil sump in the gear housing by means of a further annular connecting channel which is defined between an output shaft and the extended end of the rotor shaft projecting into the gear housing. This arrangement ensures a particularly effective cooling of the electric motor so that even at high outputs the temperatures may be maintained at a low value.

BRIEF DESCRIPTION OF THE DRAWING

The sole FIGURE is an axial sectional view of a preferred embodiment of the invention.

DESCRIPTION OF THE PREFERRED EMBODIMENT

Turning to the FIGURE, there is illustrated therein an electric drive for an automotive vehicle (not shown). The drive includes an electric motor generally designated at 1, particularly an asynchronous motor having a stator 18 and a rotor 19 surrounded by the stator 18. The stator/rotor assembly is accommodated in a motor housing 3 which has a cylindrical housing portion 83 closed at both axial ends 5 and 7 by a respective bearing plate 9, 11, each having a bearing opening 37, 39 accommodating respective roller bearings 13, 15. A hollow rotor shaft 17 secured to the rotor 19 is supported in the bearings 13, 15. The rotor 19 transmits its torque via the rotor shaft 17 to a gearing 23 accommodated in a gear housing 21. The gearing 23 includes a clutch-controlled differential drive. From an output side of the gearing 23 extend two output shafts 25 and 27 which, at their ends, carry respective coupling components 29 and 31 to operatively connect the output shafts (drive shafts) 25, 27 to non-illustrated front and rear wheels of the vehicle.

The two drive shafts 25 and 27 project from the gear housing 21 through oppositely located end walls 33 and 35 thereof with their respective ends 30, 32 which carry the coupling components 29 and 31 for the cardan shafts that transmit the torque to the front and rear wheels. The drive shaft 25 which projects through the end wall 33 of the gear housing 21 facing the motor housing 3 and adjoining the bearing plate 11 passes through openings 37 and 39 in the bearing plates 9 and 11 as well as through the hollow rotor shaft 17. This construction results in a highly compact electric drive.

The drive shaft 25 is supported in the gear housing 21 and in the rotor shaft 17 by means of respective needle bearings 41, 43. For this purpose, the bearing plate 9 which is oriented away from the gear housing 21 has a bearing recess 45 provided with an abutment face 47 for the needle bearing 43. The needle bearing 43 supporting the output shaft 25 and the ball bearing 13 supporting the rotor shaft 17 are arranged concentrically with respect to one another. This ensures a stable support for the output shaft 25. Further, the bearing recess 45 has, at the end 49 of the rotor shaft 17, an extended, annular recess 51 for a sealing ring 53 which outwardly seals the needle bearing 43.

The bearing plate 9 is at its outside provided with a hollow cylindrical projection 55 which has an annular recess 57 receiving a sealing ring 59 which, with its inner circumferential sealing face 61, lies on a cylindrical portion 63 of the coupling part 29. In this manner the roller bearing 13 is securely sealed towards the exterior.

The needle bearing 43 is lubricated with oil which is admitted through an annular channel 65 from an oil-receiving chamber 67 situated in the hollow space 70 of the rotor shaft 17 between the machined bearing surfaces 69 and 71 provided at opposite ends of the rotor shaft 17. The receiving chamber 67 is in flow-communication with an oil sump 21a in the gear housing 21 by means of an annular connecting channel 73. In this manner, in addition to lubricating the needle bearing 43, simultaneously the heat generated in the rotor 19, particularly in the rotor lamina stack 75 is removed by the thin wall of the rotor shaft 17 and the oil accommodated in the receiving chamber 67. The connecting channel 73 is situated between the output shaft 25 and the end 77 of the rotor shaft 17 projecting into the gear housing 21.

The end 77 of the rotor shaft 17 is provided with a driving pinion 79 which is coupled with the input side of the differential gear 23 by a gear 81. Expediently, the pinion 79 is formed on the rotor shaft 17 and constitutes an integral, one-piece structure therewith.

The bearing plates 9 and 11 and the cylindrical jacket portion 83 of the motor housing 3 are provided in a known manner with connecting channels 85 and deflecting channels 87, 89 for coolant water which is admitted by means of a supply channel 91 and is removed through a non-illustrated outlet channel. By means of such water cooling and by means of the additional oil cooling in the rotor region there is provided an efficient, compact electric drive for the vehicle.

It will be understood that the above description of the present invention is susceptible to various modifications, changes and adaptations, and the same are intended to be comprehended within the meaning and range of equivalents of the appended claims.

What is claimed is:

1. An electric drive for a vehicle, comprising
   (a) a motor housing having opposite first and second ends;
   (b) first and second bearing plates secured to said motor housing and closing said first and second ends, respectively; said first and second bearing plates having first and second bearing openings;
   (c) first and second roller bearings held in said first and second bearing openings of said first and second bearing plates, respectively;
   (d) an electric motor accommodated in said motor housing and including
      (1) a stator disposed in said motor housing;
      (2) a rotor surrounded by said stator;
      (3) an axially hollow rotor shaft affixed to said rotor and having opposite first and second axial end portions journalling in said first and second roller bearings, respectively;
   (e) a gear housing adjoining said motor housing and having opposite first and second end walls; said first end wall adjoining face-to-face said second bearing plate and being oriented toward said motor housing;
   (f) a gearing accommodated in said gear housing;
   (g) torque-transmitting means for torque-transmittingly coupling said rotor shaft with an input of said gearing;
   (h) a first output shaft coupled to an output of said gearing; said first output shaft extending through said first end wall of said gear housing and passing axially through said rotor shaft and through said first and second bearing plates; said first output shaft having an end situated at said first bearing plate externally of said motor housing;
   (i) a second output shaft coupled to an output of said gearing; said second output shaft extending through said second end wall of said gear housing and having an end situated at said second bearing plate externally of said gear housing; and
   (j) first and second coupling members mounted on the ends of said first and second output shafts, respectively; said first and second coupling members being adapted to transmit a driving torque to front and rear wheels of the vehicle.

2. The electric drive as defined in claim 1, further comprising a third roller bearing supporting said first output shaft in said rotor shaft and a fourth roller bearing supporting said first output shaft in said gear housing.

3. The electric drive as defined in claim 2, wherein said third and fourth roller bearings are needle bearings.

4. The electric drive as defined in claim 2, wherein said rotor shaft includes, adjacent said first bearing plate, a bearing recess bordered by an abutment for said third roller bearing; said first and said third roller bearings being concentric to one another.

5. The electric drive as defined in claim 4, wherein said rotor shaft includes, axially outwardly of and adjacent to said bearing recess, an annular recess; further comprising a sealing ring accommodated in said annular recess.

6. The electric drive as defined in claim 5, wherein said first bearing plate has an axially outwardly extending cylindrical projection surrounding said first bearing opening; said cylindrical projection including an annular recess; further wherein said first coupling member has a cylindrical portion projecting into said cylindrical projection of said first bearing plate; further comprising an additional sealing ring received in said annular recess of said cylindrical projection; said additional sealing ring having an inner circumferential surface circumferentially engaging said cylindrical portion of said first coupling member.

7. The electric drive as defined in claim 2, wherein said second end portion of said rotor shaft projects through said second bearing plate into said gear housing; said first output shaft and said second end portion of said rotor shaft together defining a first annular coupling channel communicating with an oil sump accommodated in said gear housing; further wherein said rotor shaft has an enlarged, axial, elongated oil chamber situated between said first and second roller bearings and bordered by an outer circumferential surface of said first output shaft; said oil chamber being in communication with said first annular coupling channel; wherein said rotor shaft includes, adjacent said first bearing plate, a bearing recess receiving said third roller bearing; said first output shaft and said first end portion of said rotor shaft together defining a second annular coupling channel communicating with said oil chamber and said bearing recess for admitting oil to said third roller bearing.

8. The electric drive as defined in claim 7, wherein said torque-transmitting means comprises a pinion attached to said second end portion of said rotor shaft; further comprising a gear meshing with said pinion and coupled to said input of said gearing.

9. The electric drive as defined in claim 8, wherein said pinion and said rotor shaft form a one-piece unitary component.

10. The electric drive as defined in claim 1, further comprising coolant water channels provided in said first and second bearing plates and in said motor housing.

* * * * *